United States Patent
Chigira et al.

(10) Patent No.: US 11,027,233 B2
(45) Date of Patent: Jun. 8, 2021

(54) ABSORPTION ROTOR, ROTOR ELEMENT, METHOD OF MANUFACTURING ABSORPTION ROTOR, AND METHOD OF MANUFACTURING ROTOR ELEMENT

(71) Applicant: NICHIAS Corporation, Tokyo (JP)

(72) Inventors: Yusuke Chigira, Tokyo (JP);
Katsuhiro Yamashita, Tokyo (JP);
Tomohiro Deguchi, Tokyo (JP);
Masahiro Tsuzaki, Tokyo (JP); Teruzi Yamazaki, Tokyo (JP)

(73) Assignee: NICHIAS Corporation, Tokyo (JP)

( * ) Notice: Subject to any disclaimer, the term of this patent is extended or adjusted under 35 U.S.C. 154(b) by 394 days.

(21) Appl. No.: 15/763,565

(22) PCT Filed: Aug. 17, 2016

(86) PCT No.: PCT/JP2016/073989
§ 371 (c)(1),
(2) Date: Mar. 27, 2018

(87) PCT Pub. No.: WO2018/033971
PCT Pub. Date: Feb. 22, 2018

(65) Prior Publication Data
US 2018/0264397 A1    Sep. 20, 2018

(51) Int. Cl.
*B01D 53/02* (2006.01)
*B01D 53/06* (2006.01)

(52) U.S. Cl.
CPC ........ *B01D 53/06* (2013.01); *B01D 2253/102* (2013.01); *B01D 2253/108* (2013.01); *B01D 2257/708* (2013.01)

(58) Field of Classification Search
CPC ........ B01D 2253/102; B01D 2253/108; B01D 2257/708; B01D 53/06
See application file for complete search history.

(56) References Cited

U.S. PATENT DOCUMENTS 5,595,238 A    1/1997   Mark et al.
6,527,837 B2*  3/2003   Kurosawa .............. B01D 53/06
                                              55/502
(Continued)

FOREIGN PATENT DOCUMENTS

CN    104067005 A    9/2014
JP    2003-126641 A  5/2003
(Continued)

OTHER PUBLICATIONS

Taiwanese Office Action dated Apr. 25, 2018 regarding corresponding Taiwanese Patent Application No. 106125161.
(Continued)

*Primary Examiner* — Christopher P Jones
(74) *Attorney, Agent, or Firm* — Michael Best & Friedrich LLP

(57) ABSTRACT

The present invention is to prevent an absorption member from dropping off while reducing damage to the absorption member. An absorption rotor includes plural spokes extending in a radial manner from the circumference of the rotation axis, a tubular rim 4 coupling end portions of the plural spokes, an absorption member accommodated in a space which is surrounded by the plural spokes and the rim, the absorption member that absorbs a substance to be absorbed when a gas passes through, and a drop-off prevention member respectively fixed to the spoke and the absorption member, the drop-off prevention member that prevents the absorption member from dropping off the spoke. The drop-off prevention member is arranged between the absorption member and the spoke, and between a surface from which the gas flows into the absorption member and a surface from which the gas flows out of the absorption member.

9 Claims, 9 Drawing Sheets

(56) References Cited

U.S. PATENT DOCUMENTS

| | | | | |
|---|---|---|---|---|
| 8,876,957 | B2* | 11/2014 | Fujioka | F28D 19/042 96/125 |
| 10,391,441 | B2* | 8/2019 | Chang | B01D 53/06 |
| 2005/0172805 | A1* | 8/2005 | Motono | B01D 53/261 95/113 |
| 2013/0186277 | A1 | 7/2013 | Fujioka | |

FOREIGN PATENT DOCUMENTS

| | | |
|---|---|---|
| JP | 2004-113844 A | 4/2004 |
| JP | 2013-132603 A | 7/2013 |
| TW | 590791 B | 6/2004 |
| TW | i549739 B | 9/2016 |
| WO | 2013/088447 A1 | 6/2013 |

OTHER PUBLICATIONS

International Search Report dated Sep. 27, 2016 for the corresponding International Application No. PCT/JP2016/073989.

Extended European Search Report dated Apr. 24, 2020 for the corresponding European Patent Application No. 16885454.5.

Chinese Office Action dated Mar. 18, 2021 for the corresponding Chinese Patent Application No. 201680006704.7, with English machine translation.

* cited by examiner

ABSORPTION ROTOR, ROTOR ELEMENT, METHOD OF MANUFACTURING ABSORPTION ROTOR, AND METHOD OF MANUFACTURING ROTOR ELEMENT

CROSS-REFERENCE TO RELATED APPLICATIONS

This application is entering into national phase of PCT Application No. PCT/JP2016/073989, filed on Aug. 17, 2016, the entire contents of which are hereby incorporated by reference into this application.

TECHNICAL FIELD

The present invention relates to an absorption rotor arranged in a flow passage of a gas containing a substance to be absorbed, the absorption rotor that absorbs the substance to be absorbed when the gas passes through, a rotor element, a method of manufacturing an absorption rotor, and a method of manufacturing a rotor element.

BACKGROUND ART

There is a need for detoxifying a gas containing a VOC (volatile organic compound) which is discharged from various plants such as a printing plant, a painting plant, and a semiconductor plant to discharge to the atmosphere. As a technology to treat such a gas containing a VOC, for example, there is a known system using an absorption rotor described in Patent Literature 1 below.

The absorption rotor described in Patent Literature 1 includes a honeycomb body (absorption member) placed between a boss positioned in a center portion and spokes extending from the boss to an outer circumferential ring, the honeycomb body that absorbs a VOC. In the above system, after the VOC is absorbed by letting the gas pass through while the absorption rotor is rotated about the rotation axis, the heated air is blown to a portion onto which the VOC is absorbed, so that the VOC is detached.

CITATION LIST

Patent Literature

PATENT LITERATURE 1: JP 2004-113844 A

SUMMARY OF INVENTION

Technical Problem

In the above conventional technology, the spoke and the honeycomb body are adhered to each other via a caulking material. However, since the gas passing through the absorption rotor at the time of absorbing and detaching the VOC has a high temperature, there is a fear that adhesion between the spoke and the honeycomb body is removed upon continuous usage. When the adhesion between the spoke and the honeycomb body is removed, the honeycomb body could be dropped off when the absorption rotor is rotated.

Therefore, in order to prevent the honeycomb body from dropping off, it is thought that an edge portion of an end surface (surface through which the gas passes) of the honeycomb body and the spoke are fixed by a metal fitting or the like. However, the end surface of the honeycomb body is a flow passage of the gas. Thus, the honeycomb body may be buckled by the metal fitting due to an influence of wind pressure, so that the honeycomb body may be damaged.

In such a way, a problem to tackle is to prevent the honeycomb body from dropping off the absorption rotor without damaging the honeycomb body (absorption member).

The present invention is achieved to address the above problem, and an object thereof is to provide an absorption rotor capable of preventing an absorption member from dropping off while reducing damage to the absorption member, a rotor element, a method of manufacturing an absorption rotor, and a method of manufacturing a rotor element.

Solution to Problem

The above problem is solved by an absorption rotor according to the present invention, the absorption rotor being provided in a flow passage of a gas containing a substance to be absorbed, the absorption rotor through which the gas passes while the absorption rotor is rotated about the rotation axis, the absorption rotor including plural plate members extending in a radial manner from the circumference of the rotation axis, a tubular outer edge member coupling end portions of the plural plate members, an absorption member accommodated in a space which is surrounded by the plural plate members and the outer edge member, the absorption member that absorbs the substance to be absorbed when the gas passes through, and a drop-off prevention member respectively fixed to the plate member and the absorption member, the drop-off prevention member that prevents the absorption member from dropping off the plate member, wherein the drop-off prevention member is arranged between the absorption member and the plate member, and between a surface from which the gas flows into the absorption member and a surface from which the gas flows out of the absorption member.

With the above absorption rotor, by providing the drop-off prevention member fixed both to the absorption member and the plate member, the absorption member can be prevented from dropping off the plate member.

With the above absorption rotor, the drop-off prevention member is not attached to the surfaces through which the gas passes in the absorption member. Thus, the absorption member is not buckled by the drop-off prevention member due to wind pressure.

That is, with the above absorption rotor, the absorption member can be prevented from dropping off while reducing damage to the absorption member.

With the above absorption rotor, the drop-off prevention member is provided at a position not exposed to the exterior. Thus, a design property of the absorption rotor becomes favorable.

In the above absorption rotor, the drop-off prevention member may have an embedded portion embedded in the absorption member, and an exposed portion exposed from the absorption member, and the embedded portion may be fixed to the absorption member, and the exposed portion may be fixed to the plate member.

By doing so, by embedding and attaching part of the drop-off prevention member into the absorption member, attachment of the drop-off prevention member to the absorption member can be strengthened.

In the above absorption rotor, the plate member and the drop-off prevention member may be respectively made of metal, and an outer end portion of the exposed portion on the side close to the outer edge member and the end portion of the plate member may be welded to each other.

By doing so, the number of welding points for fixing the drop-off prevention member to the plate member can be reduced. Thereby, a burden of a welding task can be reduced.

In the above absorption rotor, a hole from which the outer end portion of the drop-off prevention member and the end portion of the plate member are exposed may be formed in the outer edge member.

By doing so, the drop-off prevention member and the plate member can be welded from the outside of the outer edge member. Thereby, a working property in assembling of the absorption rotor can be improved.

From the hole formed in the outer edge member, a joining state between the drop-off prevention member and the plate member can be confirmed.

In the above absorption rotor, the exposed portion may be a flat plate extending from the vicinity of the center portion toward the outer edge member, and the embedded portion may have plural extending portions extending substantially perpendicularly from the exposed portion toward the absorption member.

By doing so, the drop-off prevention member can be strongly fixed to the absorption member.

In the above absorption rotor, the plate member may have a holding portion that holds an inner end portion of the exposed portion on the side close to the center portion.

By doing so, position displacement of the drop-off prevention member can be prevented. Thereby, the drop-off prevention member is not easily dropped off.

In the above absorption rotor, the holding portion may be formed by two metal blocks provided on a surface of the plate member facing the absorption member, the metal blocks that nip the inner end portion of the exposed portion.

By doing so, the holding portion can function as a guide at the time of attaching the absorption member to which the drop-off prevention member is attached to the plate member. Thereby, with the above absorption rotor, the absorption member can be attached to the spoke at the right position.

The above absorption rotor may include reinforcement members attached to the absorption member at positions across the drop-off prevention member with respect to the flow passage of the gas, the reinforcement members that reinforce fixing of the drop-off prevention member.

By doing so, the position displacement of the drop-off prevention member can be prevented.

The above problem is solved by a rotor element according to the present invention, the rotor element being provided in an absorption rotor which is provided in a flow passage of a gas containing a substance to be absorbed, the absorption rotor through which the gas passes while the absorption rotor is rotated about the rotation axis, the rotor element including an absorption member accommodated in a space which is surrounded by plural plate members extending in a radial manner from the circumference of the rotation axis and a tubular outer edge member coupling end portions of the plural plate members, the absorption member that absorbs the substance to be absorbed when the gas passes through, and a drop-off prevention member respectively fixed to the plate member and the absorption member, the drop-off prevention member that prevents the absorption member from dropping off the plate member, wherein the drop-off prevention member is arranged between the absorption member and the plate member, and between a surface from which the gas flows into the absorption member and a surface from which the gas flows out of the absorption member.

A method of manufacturing an absorption rotor according to the present invention is a method of manufacturing an absorption rotor including plural plate members extending in a radial manner from the circumference of the rotation axis, a tubular outer edge member coupling end portions of the plural plate members, an absorption member accommodated in a space which is surrounded by the plural plate members and the outer edge member, the absorption member that absorbs a substance to be absorbed when a gas containing the substance to be absorbed passes through, and a drop-off prevention member respectively fixed to the plate member and the absorption member, the drop-off prevention member that prevents the absorption member from dropping off the plate member, the method including the step of arranging the drop-off prevention member between the absorption member and the plate member, and between a surface from which the gas flows into the absorption member and a surface from which the gas flows out of the absorption member.

A method of manufacturing a rotor element according to the present invention is a method of manufacturing a rotor element including an absorption member accommodated in a space which is surrounded by plural plate members extending in a radial manner from the circumference of the rotation axis and a tubular outer edge member coupling end portions of the plural plate members, the absorption member that absorbs a substance to be absorbed when a gas containing the substance to be absorbed passes through, and a drop-off prevention member respectively fixed to the plate member and the absorption member, the drop-off prevention member that prevents the absorption member from dropping off the plate member, the method including the step of arranging the drop-off prevention member between the absorption member and the plate member, and between a surface from which the gas flows into the absorption member and a surface from which the gas flows out of the absorption member.

Advantageous Effects of Invention

According to the present invention, the absorption member can be prevented from dropping off while reducing damage to the absorption member.

DESCRIPTION OF EMBODIMENTS

Hereinafter, an absorption rotor 1 according to an embodiment of the present invention (hereinafter, referred to as the present embodiment) will be described with reference to FIGS. 1 to 9. The embodiment to be described below does not limit the present invention but only serves one example for facilitating understanding of the present invention. That is, the shape, size, arrangement, and the like of members to be described below can be modified or improved without departing from the gist of the present invention, and the present invention includes equivalents thereof as a matter of course.

Figure 1:
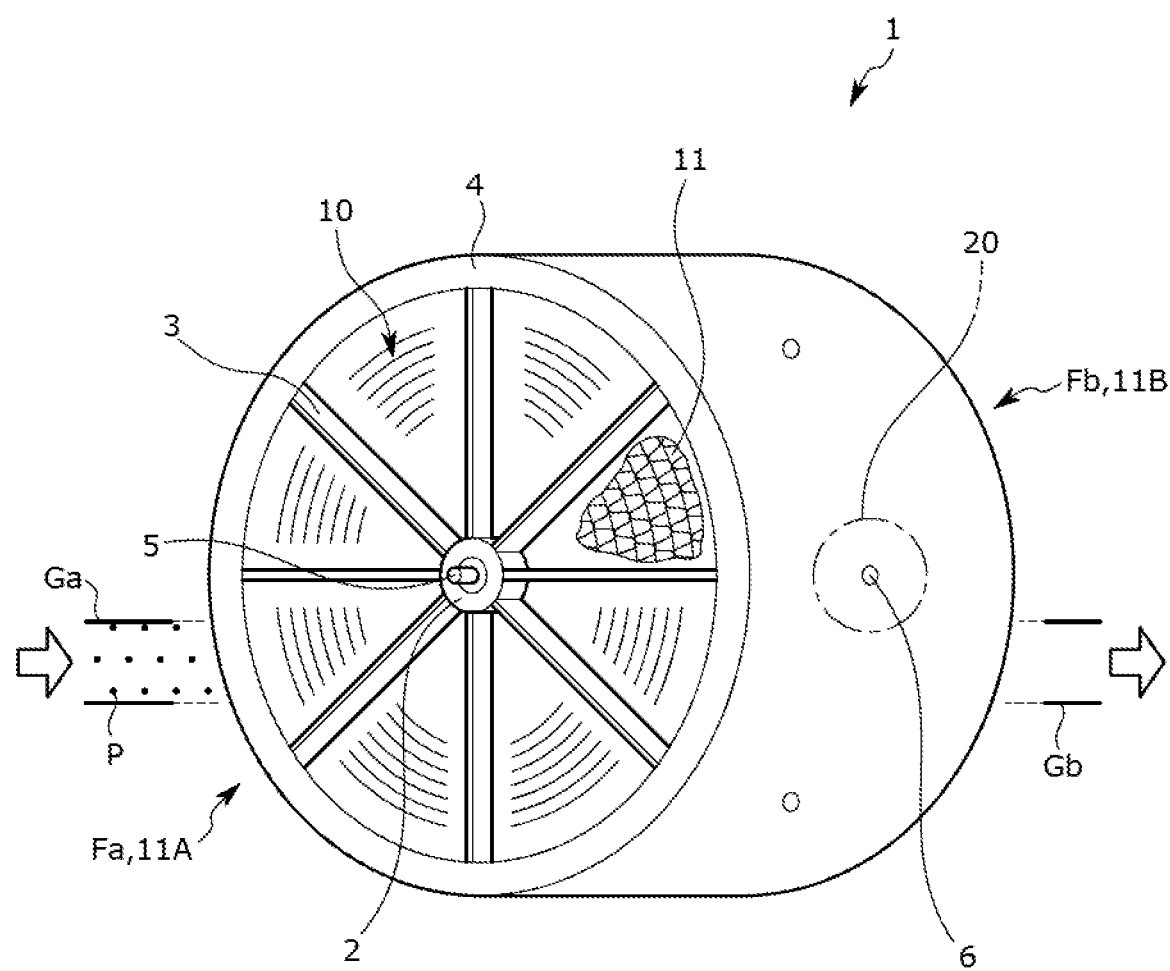
FIG. 1 is a perspective view of an absorption rotor according to the present embodiment.
Figure 2:
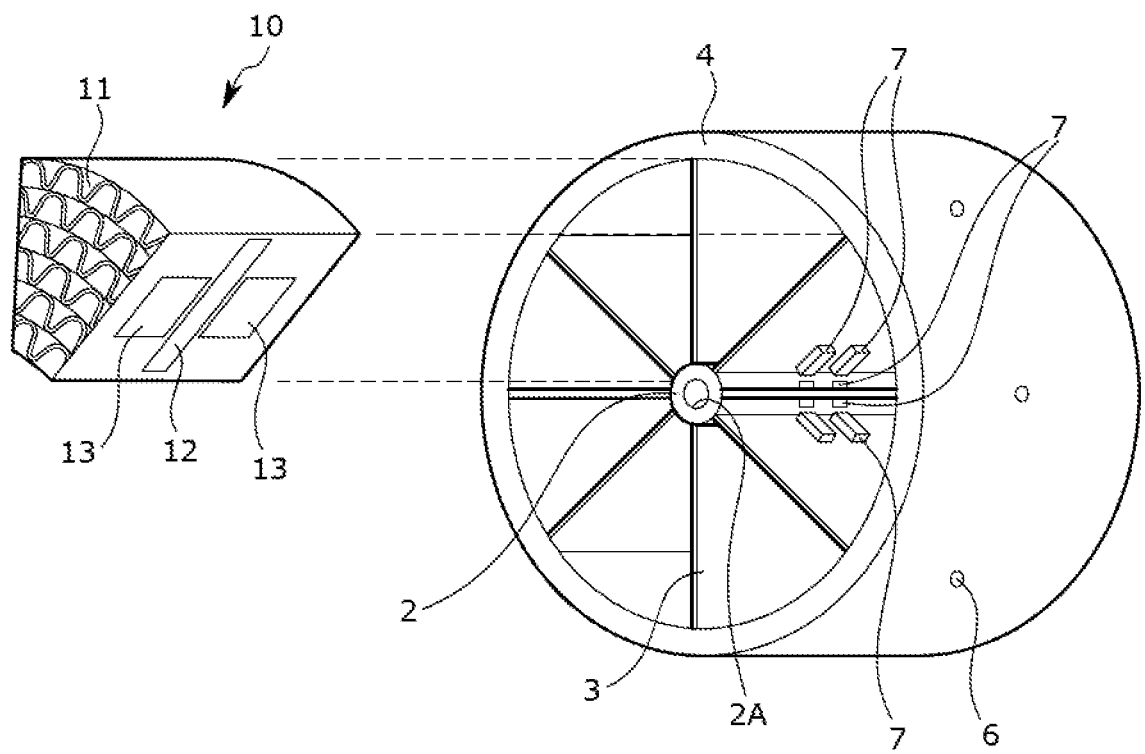
FIG. 2 is an exploded perspective view of a partial configuration of the absorption rotor.
Figure 3:
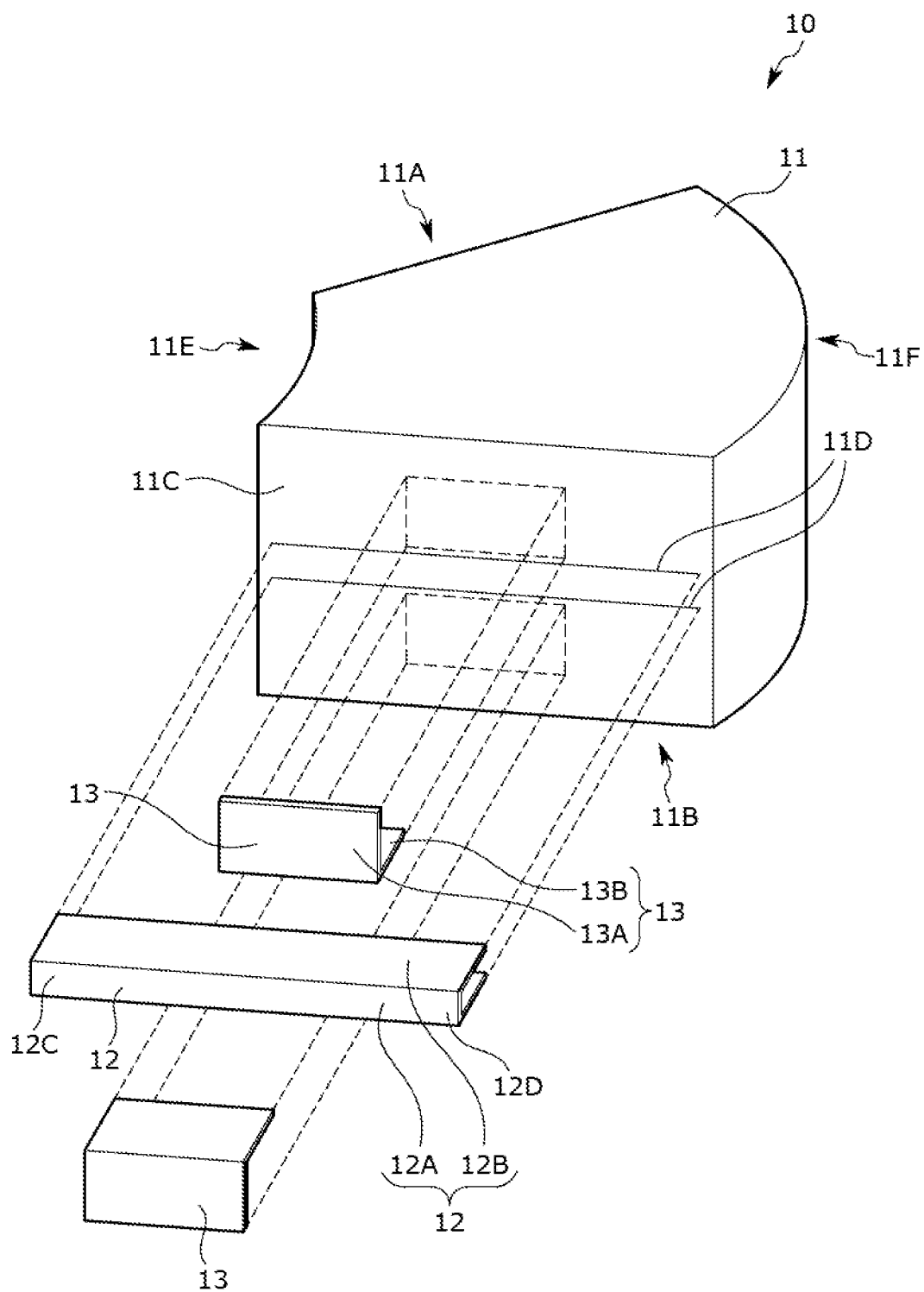
FIG. 3 is an exploded perspective view of a rotor element.
Figure 4:
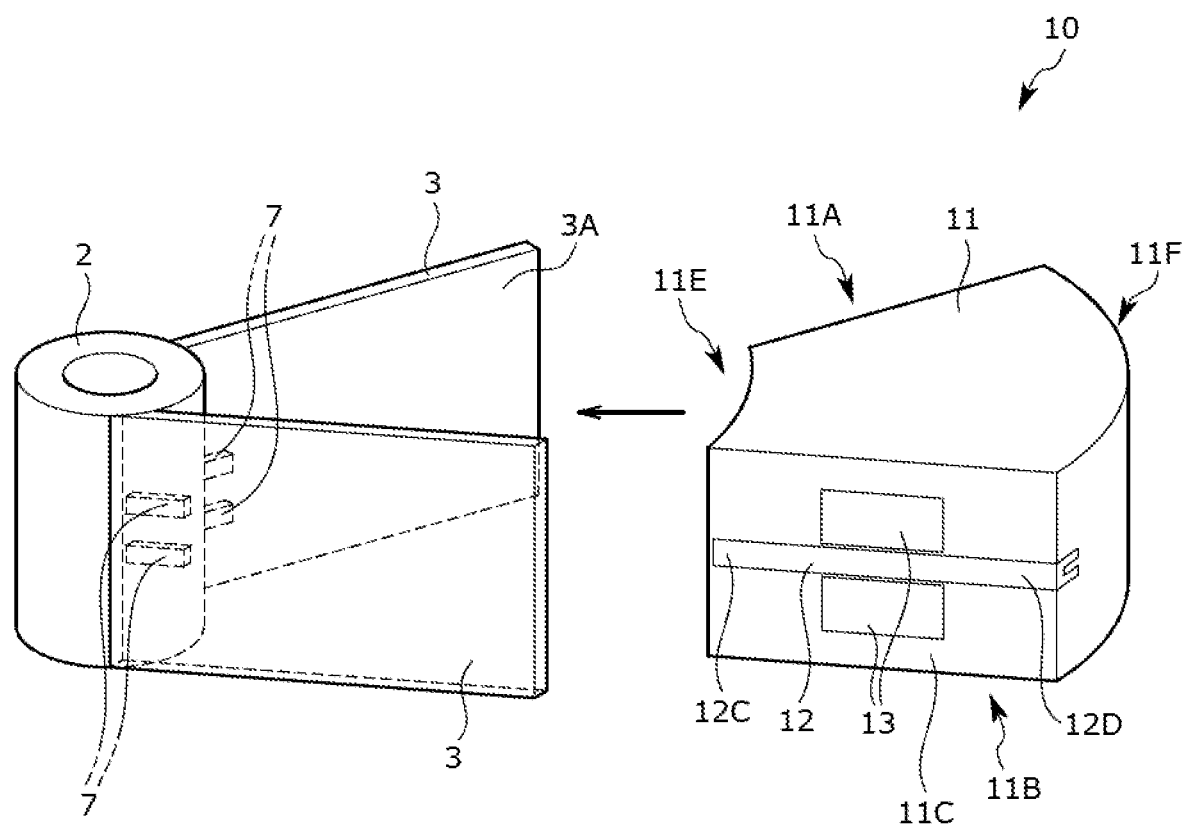
FIG. 4 is a view for illustrating attachment of the rotor element to a spoke.
Figure 5:
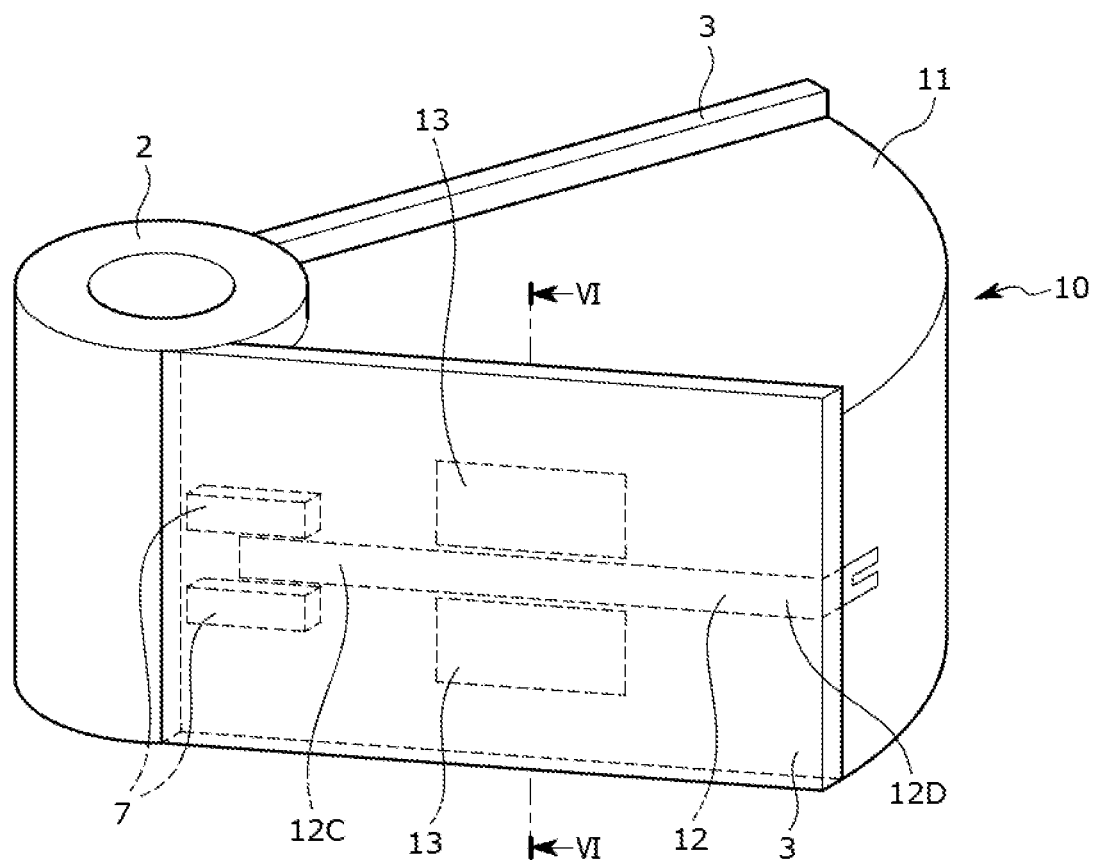
FIG. 5 is a view showing a state where the rotor element is attached to the spoke.
Figure 6:
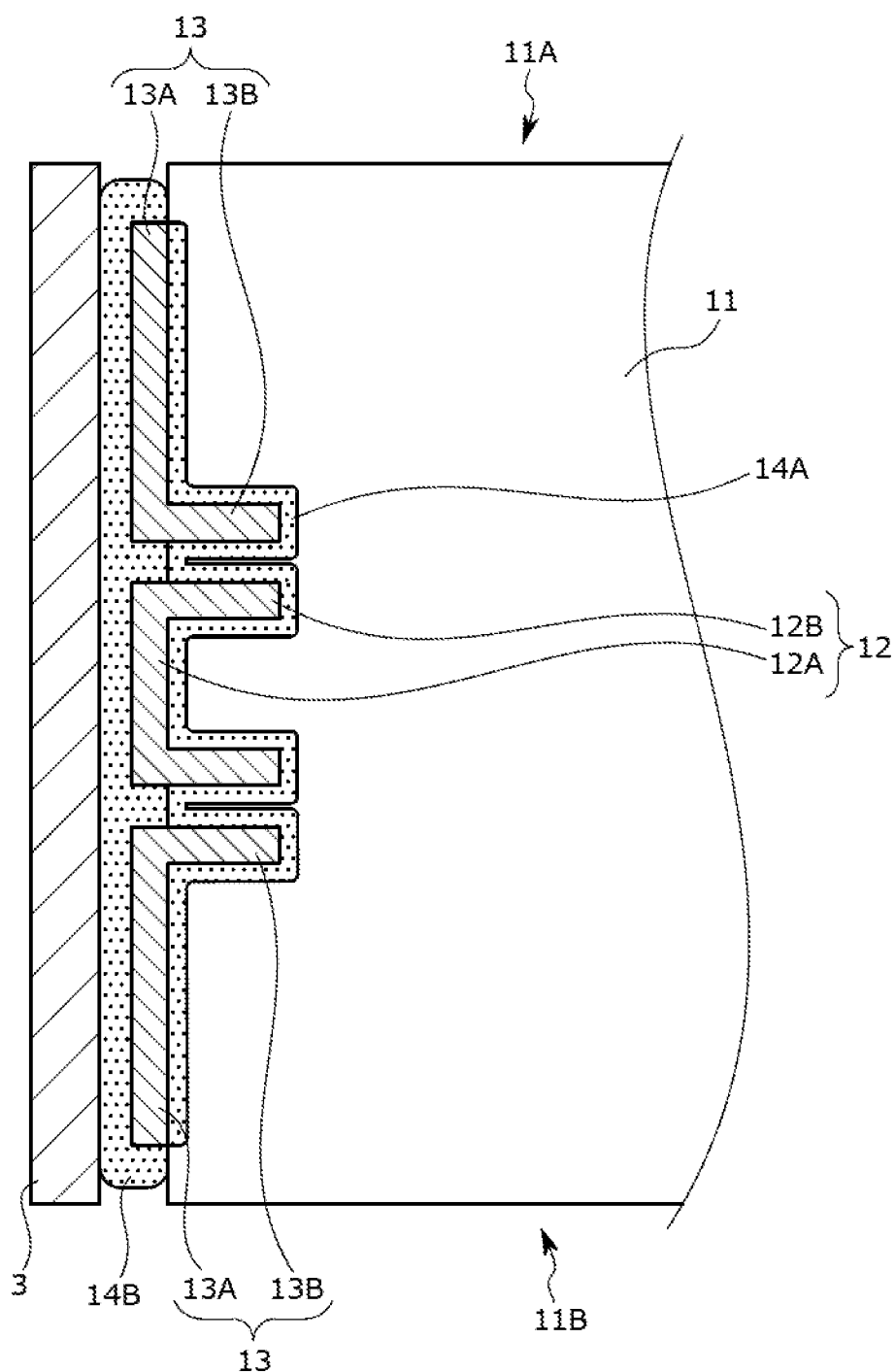
FIG. 6 is a sectional view taken along the line VI-VI of FIG. 5.
Figure 7:
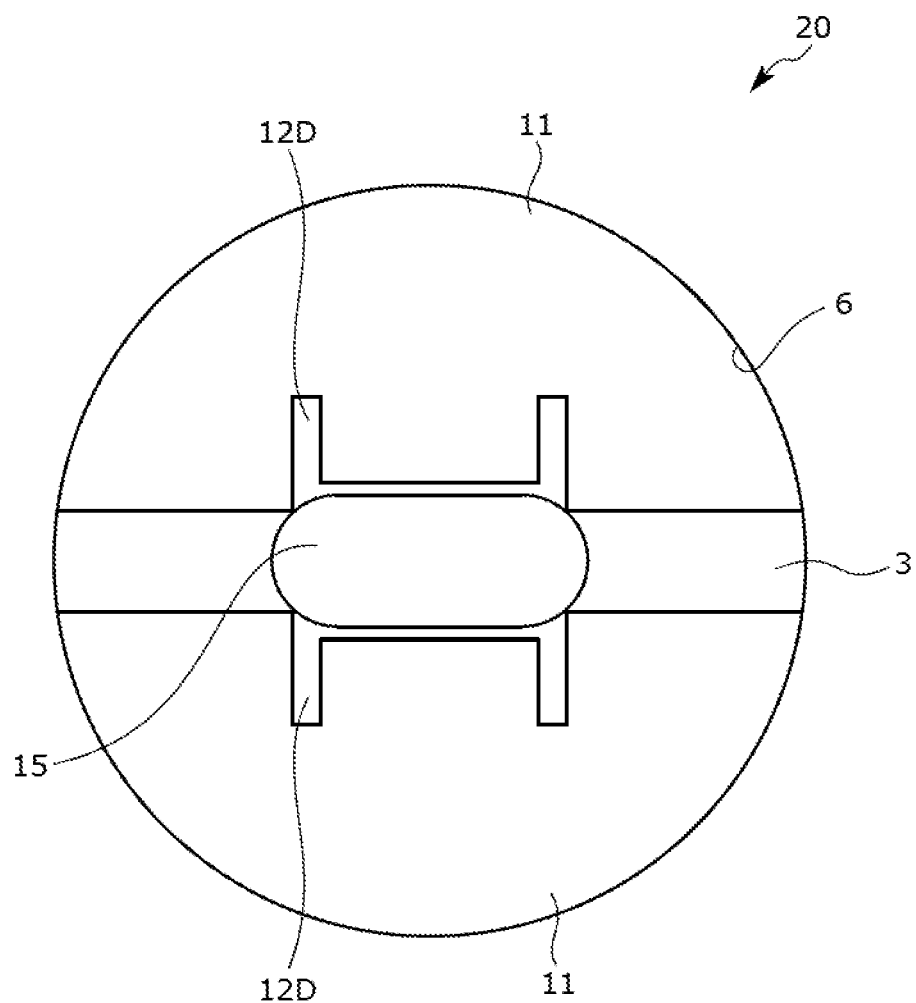
FIG. 7 is an enlarged view of the vicinity of a hole formed in a rim.

Firstly, outlines of FIGS. 1 to 7 will be described. FIG. 1 is a perspective view of the absorption rotor 1 according to the present embodiment. FIG. 2 is an exploded perspective view of a partial configuration of the absorption rotor 1. FIG. 3 is an exploded perspective view of a rotor element 10. FIG. 4 is a view for illustrating attachment of the rotor element 10 to a spoke 3. FIG. 5 is a view showing a state where the rotor element 10 is attached to the spoke 3. FIG. 6 is a sectional view taken along the line VI-VI of FIG. 5. FIG. 7 is an enlarged view of the vicinity of a hole 6 formed in a rim 4.

The absorption rotor 1 according to the present embodiment is a device provided in a flow passage of a gas containing a VOC which serves as a substance to be absorbed, for example, the device that absorbs the VOC when the gas passes through the interior of the absorption rotor 1.

That is, as shown in FIG. 1, an input gas Ga containing a substance P to be absorbed flows into an inflow surface Fa of the absorption rotor 1. At the time of passing through the absorption rotor 1, the substance P to be absorbed is absorbed. In such a way, an output gas Gb from which the substance P to be absorbed is removed is discharged from an outflow surface Fb. Hereinafter, a configuration of the absorption rotor 1 will be described.

As shown in FIG. 1, the absorption rotor 1 has a hub 2 provided in a center portion, the spokes 3 extending in a radial manner from the hub 2, and the tubular rim 4 coupling end portions of the spokes 3 as frame members.

As shown in FIGS. 1 and 2, an axial hole 2A is formed in a center portion of the hub 2, and an axial member 5 is inserted into the axial hole 2A. In such a way, the absorption rotor 1 can be rotated with the axial member 5 as the rotation axis, and the gas passes through while the absorption rotor is rotated about the axial member 5.

FIG. 2 shows a state where the rotor element 10 and the axial member 5 are detached from the frame members of the absorption rotor 1.

As shown in FIGS. 1 and 2, in each of spaces surrounded by the spokes 3 and the rim 4 (eight spaces in the present embodiment), the rotor element 10 having a substantially fan-shaped end surface is respectively accommodated.

As shown in FIGS. 2 and 3, the rotor element 10 includes an absorption member 11 that absorbs the substance P to be absorbed, a drop-off prevention member 12, and reinforcement members 13. The drop-off prevention member 12 and the reinforcement members 13 are provided on a side surface 11C (surface facing the spoke 3) of the absorption member 11.

The absorption member 11 is an absorption element of a honeycomb structure, in which the flow passage of the gas is formed in the direction along the axial member 5. In the absorption member 11, an absorbent such as activated carbon and hydrophobic zeolite is supported by a honeycomb structure body formed by corrugating an inorganic fabric paper, for example.

As shown in FIG. 3, a substantially fan-shaped end surface 11A and an end surface 11B of a back surface thereof in the absorption member 11 serve as surfaces through which the gas passes.

As shown in FIG. 3, the drop-off prevention member 12 is a metal member (such as a steel plate) having a substantially U-shaped section and extending substantially from an inner end portion 11E to an outer end portion 11F.

Specifically, as shown in FIGS. 3 and 6, the drop-off prevention member 12 includes a flat plate-shaped exposed portion 12A placed along the side surface 11C of the absorption member 11, and embedded portions 12B extending from the exposed portion 12A to the side of the absorption member 11.

The drop-off prevention member 12 is attached to the absorption member 11 as follows, for example. That is, in a state where a caulking material 14A is applied to a surface of the drop-off prevention member 12 on the side facing the absorption member 11, the embedded portions 12B are inserted into slits 11D formed on the side surface 11C of the absorption member 11.

The slits 11D are formed in a substantially center part of the side surface 11C (specifically, in a substantially center portion in the thickness direction which is orthogonal to the radial direction and the circumferential direction of the substantially fan-shaped absorption member 11 shown in FIG. 3). Thereby, the drop-off prevention member 12 is attached to the substantially center part of the side surface 11C.

An outer end portion 12D of the drop-off prevention member 12 is attached at the substantially same position as the outer end portion 11F of the absorption member 11.

As shown in FIG. 3, the reinforcement member 13 is a metal member having an L-shaped section. Specifically, as shown in FIGS. 3 and 6, the reinforcement member 13 has a flat plate-shaped exposed portion 13A placed along the side surface 11C of the absorption member 11, and an embedded portion 13B extending from the exposed portion 13A to the side of the absorption member 11.

The reinforcement member 13 is attached to the absorption member 11 as follows, for example. That is, in a state where an adhesion layer made of the caulking material 14A such as silicon is formed on a surface of the reinforcement member 13 on the side facing the absorption member 11, the embedded portion 13B is inserted at a position adjacent to the embedded portion 12B. The insertion position of the embedded portion 13B may be the slit 11D, for example, or may be a slit separately formed at a position adjacent to the slit 11D.

The reinforcement members 13 are attached on both the sides of the drop-off prevention member 12. By attaching the reinforcement members 13 on both the sides of the drop-off prevention member 12 in such a way, position displacement or warp of the drop-off prevention member 12 is suppressed.

A side surface on the opposite side of the side surface 11C shown in FIG. 3 has the same configuration.

Next, the attachment of the rotor element 10 to the spoke 3 will be described with reference to FIGS. 4 to 6.

FIG. 4 extracts and shows part of the spoke 3. As shown in FIG. 4, holding portions 7 are formed in a part coupled to the hub 2 on an attachment surface 3A of the spoke 3 to which the rotor element 10 is attached.

The holding portions 7 are formed by plural nipping bodies that nip an inner end portion 12C, and the above nipping bodies are, for example, blocks made of metal (such as steel plates). In the present embodiment, two nipping bodies are attached to the attachment surface 3A of the spoke 3. The two nipping bodies are separated from each other so that the drop-off prevention member 12 can be inserted between both the nipping bodies. The holding portions 7 may be attached to the attachment surface 3A of the spoke 3 by, for example, welding. The above method of welding is not particularly limited but, for example, arc welding, laser welding, and the like can be used.

The step of attaching the rotor element 10 between the two spokes 3 extending from the hub 2 is as follows, for example. That is, in a state where an adhesion layer made of a caulking material 14B such as silicon is formed on the attachment surface 3A, the rotor element 10 is attached between the two spokes 3 extending from the hub 2. The rotor element 10 is pushed into the spoke 3 in such a manner that the inner end portion 12C of the drop-off prevention member 12 is nipped between the two holding portions 7.

By attaching the rotor element 10 between the spokes 3, the absorption rotor 1 is manufactured.

By the above step, the rotor element 10 in which the drop-off prevention member 12 is arranged between the absorption member 11 and the spoke 3, and between the end surface 11A from which the gas flows into the absorption member 11 and the end surface 11B from which the gas flows out of the absorption member, and the absorption rotor 1 including such a rotor element 10 can be manufactured.

FIG. 5 shows a state where the rotor element 10 is attached to the spoke 3. The side surface 11C of the rotor element 10 and the attachment surface 3A are adhered to each other via the caulking material 14B. Thereby, in a state where a gap between the rotor element 10 and the spoke 3 is charged with the caulking material 14B, the rotor element 10 is fixed to the spoke 3.

In such a way, the gap between the rotor element 10 and the spoke 3 is filled with the caulking material 14B. Thus, the gas flowing into the absorption rotor 1 can be secured to pass through the absorption member 11.

In a state where the inner end portion 12C of the drop-off prevention member 12 provided in the rotor element 10 is nipped by the two holding portions 7 provided in the spoke 3, the outer end portion 12D of the drop-off prevention member 12 is welded to the spoke 3.

Thereby, both ends of the drop-off prevention member 12 are fixed to the spoke 3. As a result, the attachment between the rotor element 10 and the spoke 3 can be more strengthened, so that the rotor element 10 is prevented from dropping off the spoke 3.

As shown in FIGS. 1 and 7, in the rim 4, the hole 6 may be formed at a position where the spoke 3 and the outer end portion 12D of the drop-off prevention member 12 are abutted with each other. The spoke 3 and the outer end portion 12D exposed from the hole 6 may be welded from the exterior of the rim 4.

A welded portion 15 shown in FIG. 7 shows a welding mark of the outer end portion 12D of the drop-off prevention member 12 and the spoke 3. The above method of welding is not particularly limited but, for example, arc welding, laser welding, and the like can be used.

Another example of the attachment of the rotor element 10 to the spoke 3 will be described with reference to FIGS. 8 and 9.

Figure 8:
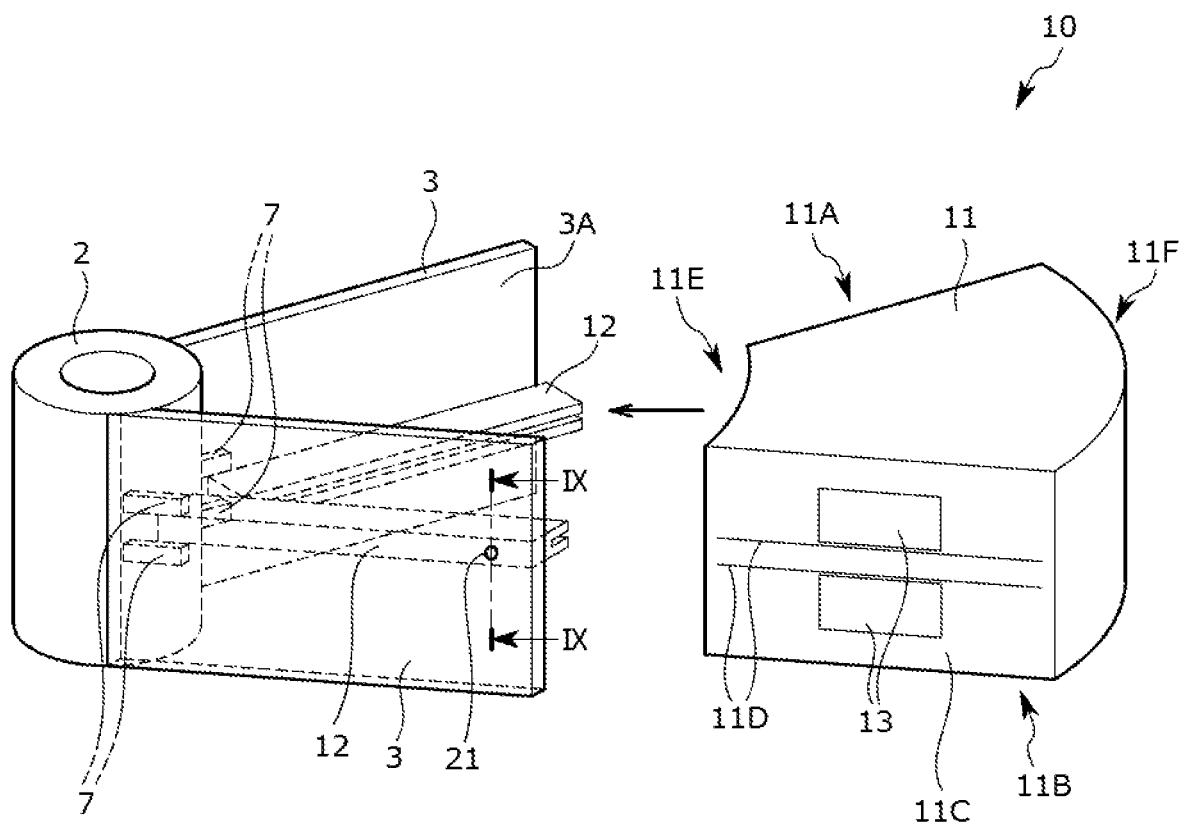
FIG. 8 is a view for illustrating another example of the attachment of the rotor element to the spoke.

FIG. 8 is a view for illustrating another example of the attachment of the rotor element to the spoke. FIG. 9 is a sectional view taken along the line IX-IX of FIG. 8 in a state where the rotor element is attached to the spoke.

In the example to be described below, the drop-off prevention member 12 is attached to the spoke 3 in advance, and then the absorption member 11 is attached to the spoke 3 to which the drop-off prevention member 12 is attached.

As shown in FIG. 8, a through hole 21 is formed in a rear end of the spoke 3 which is a part facing the drop-off prevention member 12. A through hole is also formed in a part of the drop-off prevention member 12 facing the through hole 21.

Figure 9:
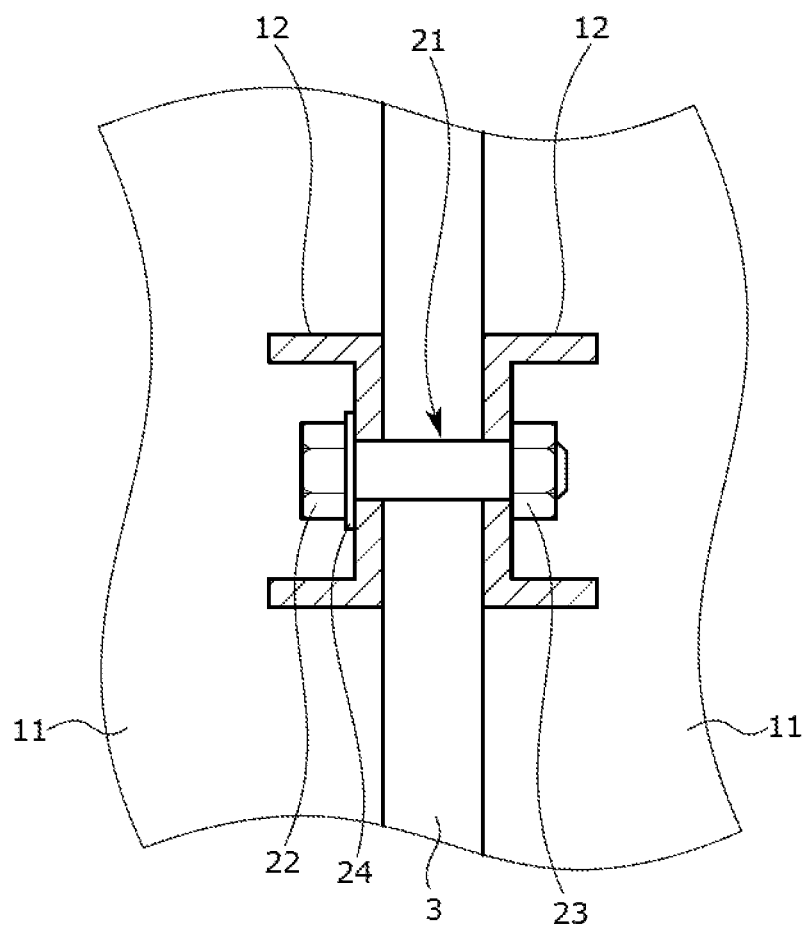
FIG. 9 is a sectional view taken along the line IX-IX of FIG. 8 in a state where the rotor element is attached to the spoke.

As shown in FIG. 9, two drop-off prevention members 12 are arranged to face each other across the spoke 3. The inner end portion 12C of the drop-off prevention member 12 is nipped by the holding portions 7.

For the drop-off prevention members 12 arranged to face each other across the spoke 3, in a state where a bolt 22 is inserted into the through hole 21 via a washer 24, an end portion of the bolt 22 is fastened by a nut 23. Thereby, the drop-off prevention members 12 are fixed to the spoke 3.

Next, the adhesion layer made of the caulking material such as silicon is formed on the attachment surface 3A of the spoke 3 to which the drop-off prevention member 12 is attached. The absorption member 11 to which the reinforcement members 13 are attached is pushed in to the spoke 3 to which the drop-off prevention member 12 is attached, so that the embedded portions 12B of the drop-off prevention member 12 are inserted into the slits 11D of the absorption member 11. In such a way, the rotor element 10 can be attached to the spoke 3.

By attaching the rotor element 10 between the spokes 3, the absorption rotor 1 is manufactured.

By the above step, the rotor element 10 in which the drop-off prevention member 12 is arranged between the absorption member 11 and the spoke 3, and between the end surface 11A from which the gas flows into the absorption member 11 and the end surface 11B from which the gas flows out of the absorption member, and the absorption rotor 1 including such a rotor element 10 are manufactured.

With the absorption rotor 1 according to the present embodiment described above, by providing the drop-off prevention member 12 fixed both to the absorption member 11 and the spoke 3, the absorption member 11 can be prevented from dropping off the spoke 3.

With the absorption rotor 1, the drop-off prevention member 12 is not attached to the end surface 11A and the end surface 11B through which the gas passes in the absorption member 11. Thus, the absorption member 11 is not buckled by the drop-off prevention member 12 due to wind pressure of the gas.

That is, with the absorption rotor 1, the absorption member 11 can be prevented from dropping off while reducing damage to the absorption member 11.

With the absorption rotor 1, the drop-off prevention member 12 is provided at a position not exposed to the exterior. Thus, a design property of the absorption rotor becomes favorable.

With the absorption rotor 1, by embedding and attaching part of the drop-off prevention member 12 into the absorption member 11, attachment of the drop-off prevention member 12 to the absorption member 11 can be strengthened.

With the absorption rotor 1, welding points for fixing the drop-off prevention member 12 to the spoke 3 may be only the outer end portion 12D of the drop-off prevention member 12. Thus, the number of the welding points can be reduced. Thereby, a burden of a welding task at the time of attaching the drop-off prevention member 12 to the spoke 3 can be reduced.

With the absorption rotor 1, the hole 6 from which the outer end portion 12D of the drop-off prevention member 12 and the end portion of the spoke 3 are exposed is formed in the rim 4. Thus, the drop-off prevention member 12 and the spoke 3 can be welded from the outside of the rim 4. Thereby, a working property in assembling of the absorption rotor is improved.

From the hole 6 formed in the rim 4, a joining state between the drop-off prevention member 12 and the spoke 3 can be confirmed.

With the absorption rotor 1, the drop-off prevention member 12 is formed by a metal member having a substantially U-shaped section, and both the end portions are embedded in the absorption member 11. Thus, the drop-off prevention member 12 can be strongly fixed to the absorption member 11.

With the absorption rotor 1, the spoke 3 includes the holding portions 7 that hold the inner end portion 12C of the drop-off prevention member 12 (exposed portion 12A) on the side close to the hub 2. Thus, the position displacement of the drop-off prevention member 12 can be prevented. Thereby, the drop-off prevention member 12 is not easily dropped off the spoke 3.

The holding portions 7 function as a guide at the time of attaching the rotor element 10 to the spoke 3. Thus, the rotor element 10 is easily attached to the spoke 3 at the right position.

The absorption rotor 1 includes the reinforcement members 13 attached to the absorption member 11 at positions across the drop-off prevention member 12 with respect to the flow passage of the gas. Thus, the position displacement of the drop-off prevention member 12 can be prevented.

With the absorption rotor 1, for the rotor element 10 and the spoke 3, two types of joining including the joining using the caulking material and the joining by welding are used. Thus, redundancy of the joining between the rotor element 10 and the spoke 3 can be enhanced. Thereby, the rotor element 10 is not easily dropped off the spoke 3.

The present invention is not limited to the above embodiment. For example, in the above embodiment, the example in which the absorption rotor 1 is applied to a VOC treatment device is described. However, the absorption rotor 1 may be applied to a dehumidifying device, a deodorizing device, and the like.

In the above embodiment, the outer end portion 12D of the drop-off prevention member 12 and the spoke 3 are joined to each other by welding. However, the outer end portion and the spoke may be joined mechanically by using bolts, nuts, and the like.

In the above embodiment, the example in which the two reinforcement members 13 are provided for the drop-off prevention member 12 is described. However, the number of the reinforcement members 13 may be one, three, or more.

Arrangement of the reinforcement members 13 is also not limited to the one shown in FIG. 3 and the like. For example, regarding the rotor element 10 shown in FIG. 3, right and left positions of the reinforcement members 13 arranged on the upper and lower sides of the drop-off prevention member 12 may be displaced from each other.

In the above embodiment, the drop-off prevention member 12 has the exposed portion 12A and the embedded portions 12B. However, the drop-off prevention member 12 may be formed only by an embedded portion 12B. In this case, one end portion of the embedded portion 12B can be fixed to the spoke 3 and the other end portion can be embedded in the absorption member 11.

In the above embodiment, the two (two streaks of) embedded portions 12B of the drop-off prevention member 12 are provided. However, one, three, or more (streaks of) embedded portions 12B may be provided.

In the above embodiment, the holding portions 7 are formed by the two nipping bodies. However, the holding portions may be formed by three or more nipping bodies.

In the above embodiment, as one example of the attachment of the rotor element 10 to the spoke 3, the drop-off prevention member 12 is attached to the spoke 3 in advance as in FIGS. 8 and 9, and then the absorption member 11 (rotor element 10) is attached to the drop-off prevention member 12. However, the present invention is not limited to this. For example, the drop-off prevention member 12 may be attached to the absorption member 11 in advance, and then the drop-off prevention member 12 may be attached to the spoke 3. In this case, at the time of attaching one drop-off prevention member 12 to the spoke 3, firstly, part of a portion of the absorption member 11, the portion to which the drop-off prevention member 12 is attached is cut out, and a space for installing any one of a head portion of a bolt and a nut to be screwed onto the leading end side of a threaded portion of the bolt is provided in the absorption member 11. Then, the head portion of the bolt or the nut is arranged in the space, and the drop-off prevention member 12 and the spoke 3 are fixed by the bolt and the nut.

REFERENCE SIGNS LIST

1: Absorption rotor
2: Hub (center portion)
2A: Axial hole
3: Spoke (plate member)
3A: Attachment surface
4: Rim (outer edge member)
5: Axial member (rotation axis)
6: Hole
7: Holding portion (nipping body)
10: Rotor element
11: Absorption member
11A: End surface
11B: End surface
11C: Side surface
11D: Slit
11E: Inner end portion
11F: Outer end portion
12: Drop-off prevention member
12A: Exposed portion
12B: Embedded portion
12C: Inner end portion
12D: Outer end portion
13: Reinforcement member
13A: Exposed portion
13B: Embedded portion
14A: Caulking material
14B: Caulking material
15: Welded portion
20: Vicinity of hole
21: Through hole
22: Bolt
23: Nut
24: Washer
Fa: Inflow surface
Fb: Outflow surface
Ga: Input gas
Gb: Output gas
P: Substance to be absorbed

What is claimed is:
1. An absorption rotor provided in a flow passage of a gas containing a substance to be absorbed, the absorption rotor through which the gas passes while the absorption rotor is rotated about a rotation axis, comprising:
- plural plate members extending in a radial manner from a circumference of the rotation axis;
- a tubular outer edge member coupling end portions of the plural plate members;
- an absorption member accommodated in a space which is surrounded by the plural plate members and the tubular outer edge member, the absorption member that absorbs the substance to be absorbed when the gas passes through; and
- a drop-off prevention member respectively fixed to one plate member of the plural plate members and the absorption member, the drop-off prevention member that prevents the absorption member from dropping off the plate member,
- wherein
- the drop-off prevention member is arranged between the absorption member and the plate member, and between a surface from which the gas flows into the absorption member and a surface from which the gas flows out of the absorption member,
- the drop-off prevention member has an embedded portion embedded in the absorption member, and an exposed portion exposed from the absorption member,
- the embedded portion is fixed to the absorption member, and the exposed portion is fixed to the plate member,
- the plate member has a holding portion that holds an inner end portion of the exposed portion, the inner end portion being an end portion of the exposed portion of the drop-off prevention member on the side close to the rotation axis, and
- the holding portion is provided on a surface of the plate member that is adjacent to the rotation axis, and protrudes from the surface of the plate member.

2. The absorption rotor according to claim 1, wherein
the plate member and the drop-off prevention member are respectively made of metal, and
an outer end portion of the exposed portion on the side close to the tubular outer edge member and the end portion of the plate member are welded to each other.

3. The absorption rotor according to claim 2, wherein
a hole from which the outer end portion of the drop-off prevention member and the end portion of the plate member are exposed is formed in the tubular outer edge member.

4. The absorption rotor according to claim 1, wherein
the exposed portion is a flat plate extending from the vicinity of the rotation axis toward the tubular outer edge member, and
the embedded portion has one or plural extending portions extending substantially perpendicularly from the exposed portion toward the absorption member.

5. The absorption rotor according to claim 1, wherein
the holding portion comprises plural nipping bodies provided on the surface of the plate member facing the absorption member, and
the inner end portion of the exposed portion is sandwiched between the plural nipping bodies.

6. The absorption rotor according to claim 1, further comprising:
reinforcement members attached to the absorption member at positions across the drop-off prevention member with respect to the flow passage of the gas, the reinforcement members that reinforce fixing of the drop-off prevention member.

7. A rotor element provided in an absorption rotor which is provided in a flow passage of a gas containing a substance to be absorbed, the absorption rotor through which the gas passes while the absorption rotor is rotated about a rotation axis, the rotor element comprising:
- an absorption member accommodated in a space which is surrounded by plural plate members extending in a radial manner from a circumference of the rotation axis and a tubular outer edge member coupling end portions of the plural plate members, the absorption member that absorbs the substance to be absorbed when the gas passes through; and
- a drop-off prevention member respectively fixed to one plate member of the plural plate members and the absorption member, the drop-off prevention member that prevents the absorption member from dropping off the plate member,
- wherein
- the drop-off prevention member is arranged between the absorption member and the plate member, and between a surface from which the gas flows into the absorption member and a surface from which the gas flows out of the absorption member,
- the drop-off prevention member has an embedded portion embedded in the absorption member, and an exposed portion exposed from the absorption member,
- the embedded portion is fixed to the absorption member, and the exposed portion is fixed to the plate member,
- the plate member has a holding portion that holds an inner end portion of the exposed portion, the inner end portion being an end portion of the exposed portion of the drop-off prevention member on the side close to the rotation axis, and
- the holding portion is provided on a surface of the plate member that is adjacent to the rotation axis, and protrudes from the surface of the plate member.

8. A method of manufacturing an absorption rotor including plural plate members extending in a radial manner from a circumference of a rotation axis, a tubular outer edge member coupling end portions of the plural plate members, an absorption member accommodated in a space which is surrounded by the plural plate members and the tubular outer edge member, the absorption member that absorbs a substance to be absorbed when a gas containing the substance to be absorbed passes through, and a drop-off prevention member respectively fixed to one plate member of the plural plate members and the absorption member, the drop-off prevention member that prevents the absorption member from dropping off the plate member,
the method comprising the step of:
- arranging the drop-off prevention member between the absorption member and the plate member, and between a surface from which the gas flows into the absorption member and a surface from which the gas flows out of the absorption member, wherein
- the drop-off prevention member has an embedded portion embedded in the absorption member, and an exposed portion exposed from the absorption member,
- the embedded portion is fixed to the absorption member, and the exposed portion is fixed to the plate member,
- the plate member has a holding portion that holds an inner end portion of the exposed portion, the inner end portion being an end portion of the exposed portion of the drop-off prevention member on the side close to the rotation axis, and the holding portion is provided on a surface of the plate member that is adjacent to the rotation axis, and protrudes from the surface of the plate member.

9. A method of manufacturing a rotor element including an absorption member accommodated in a space which is surrounded by plural plate members extending in a radial manner from a circumference of a rotation axis and a tubular outer edge member coupling end portions of the plural plate members, the absorption member that absorbs a substance to be absorbed when a gas containing the substance to be absorbed passes through, and a drop-off prevention member respectively fixed to one plate member of the plural plate members and the absorption member, the drop-off prevention member that prevents the absorption member from dropping off the plate member, the method comprising the step of:

arranging the drop-off prevention member between the absorption member and the plate member, and between a surface from which the gas flows into the absorption member and a surface from which the gas flows out of the absorption member, wherein the drop-off prevention member has an embedded portion embedded in the absorption member, and an exposed portion exposed from the absorption member, the embedded portion is fixed to the absorption member, and the exposed portion is fixed to the plate member, the plate member has a holding portion that holds an inner end portion of the exposed portion, the inner end portion being an end portion of the exposed portion of the drop-off prevention member on the side close to the rotation axis, and the holding portion is provided on a surface of the plate member that is adjacent to the rotation axis, and protrudes from the surface of the plate member.

* * * * *